United States Patent

[11] 3,565,418

[72] Inventor Jerold W. Arnold
9709 Lyric Lane, Jeffersontown, Ky. 40299
[21] Appl. No. 760,801
[22] Filed Sept. 19, 1968
[45] Patented Feb. 23, 1971

[54] WORKPIECE POSITIONING DEVICE
7 Claims, 9 Drawing Figs.
[52] U.S. Cl.................................................. 269/317, 269/254
[51] Int. Cl.................................................. B23q 3/18
[50] Field of Search.......................................... 269/10, 54, 154, 166, 231, 235, 254, 315, 317, 321 (ME)

[56] References Cited
UNITED STATES PATENTS
969,546  9/1910  Lewis et al.................... 269/254X Primary Examiner—Andrew R. Juhasz
Assistant Examiner—Donald D. Evenson
Attorney—William R. Price ABSTRACT: Discloses a workpiece positioning device for pushing raw materials, such as a strip stock, into contact with a fixed stop or guide rail while the stock is advancing through a die. Another use of this unit is to push a workpiece into position against a fixed stop or rail so that the part is accurately located for secondary operations. The unit comprises a housing containing a power storage member either in the form of a rotatably mounted plate or power stem tensioned against a torque producing member such as a spring and a torque transmitting and work engaging protuberance which is movable into abutting relation to a workpiece so as to transmit torque from said power storage member to said workpiece.

PATENTED FEB 23 1971

3,565,418

INVENTOR.
JEROLD W ARNOLD
BY
ATTORNEY

INVENTOR.
JEROLD W. ARNOLD
BY
ATTORNEY

WORKPIECE POSITIONING DEVICE

FIELD OF THE INVENTION

This invention relates to a workpiece positioning device and more specifically to a device for positioning a workpiece against a guide rail or fixed stop for purposes of accurately locating said workpiece for secondary operations. In one embodiment, this invention relates to a work positioning device adapted to push raw materials such as a strip metal stock into contact with a guide rail while the strip stock is advancing through a die.

DESCRIPTION OF THE PRIOR ART

In milling, gauge tooling and jig operations in which the workpiece operated upon is supported or carried by a bed or die, it is essential to accurate working that the work be held firmly and rigidly in position during the operation thereon.

Accordingly, as is shown in FIG. 1 of the drawings, it has been the practice, for example, with progressive dies to provide a front and rear stock guide rail through which the sheet metal stock advances with minimum clearance. In such operations, it is necessary to dowel locate each rail to the die sections with extreme accuracy, usually plus or minus .001 inch from the maximum width of the raw material.

To this end, there has been designed a stock pusher assembly or locator utilized with the front guide rail to push the sheet stock against the rear stock guide rail. This assembly is installed into a groove in the front guide rail which is closely machined for a free slide fit with the pusher. A spring, mounted on the rod as shown, forces the raw material to ride against the rear stock guide rail. FIG. 2 illustrates still another type of standard stock pusher which utilizes two spring-loaded arms to apply force to the advancing strip stock against the rear stock rail. Unfortunately, this latter pusher cannot be used in the die area but only in the area preceding the die portion.

SUMMARY OF THE INVENTION

According to this invention, there is provided a torque transmitting protuberance powered by and attached to a power transmitting member rotatably mounted inside a housing and connected to a torque producing means, such as a spring.

The torque producing means in one embodiment, is a tensioned spring, which applies torque to a rotatably mounted power storage member, either in the form of a power stem or a power plate. To the power plate is attached, at a point spaced from the center of its axis of rotation, a torque transmitting and work engaging protuberance. This protuberance is movable in an arc, defined by a slot in the top of a housing, into resilient and abutting relation with a workpiece so as to transmit torque from said power storage member to said workpiece and push said workpiece into engagement with a fixed stop or guide rail. The design of the work positioning device is unique in that costly jig boring for fixed locator pins is eliminated since it only necessary to drill a hole and place the housing of the device in said hole and anchor same with a screw. The torque transmitting and work engaging protuberance which, preferably, is in the form of a pin, is allowed to travel through an arc defined by the slot in the top of the housing. Therefore the pin is in abutting contact with the stock to push the stock into rubbing engagement with the fixed guide rail. By utilization of a cap plate on the top of the torque transmitting pin, the front guide rail can be eliminated since the cap plate prevents the strip stock from jumping out of the track. Through the use of the resiliently mounted torque transmitting member in the slot in the top of the housing, it is unnecessary to require extreme accuracy in locating the stock guide rail relative to width and camber tolerances of steel strip stock manufacturers. Further, the design is unique inasmuch as raw material is forced to an X–X-axis and improves die operation by not permitting the raw material to "float" between two fixed guide rails. Further, the design is unique as all variations of part lengths or widths are compensated by the torque of the pusher pin hence, the X–X and Y–Y axes are both positively located.

BRIEF DESCRIPTION OF THE DRAWINGS

Referring now to the drawings.

DESCRIPTION OF THE PREFERRED EMBODIMENT

Figure 1:
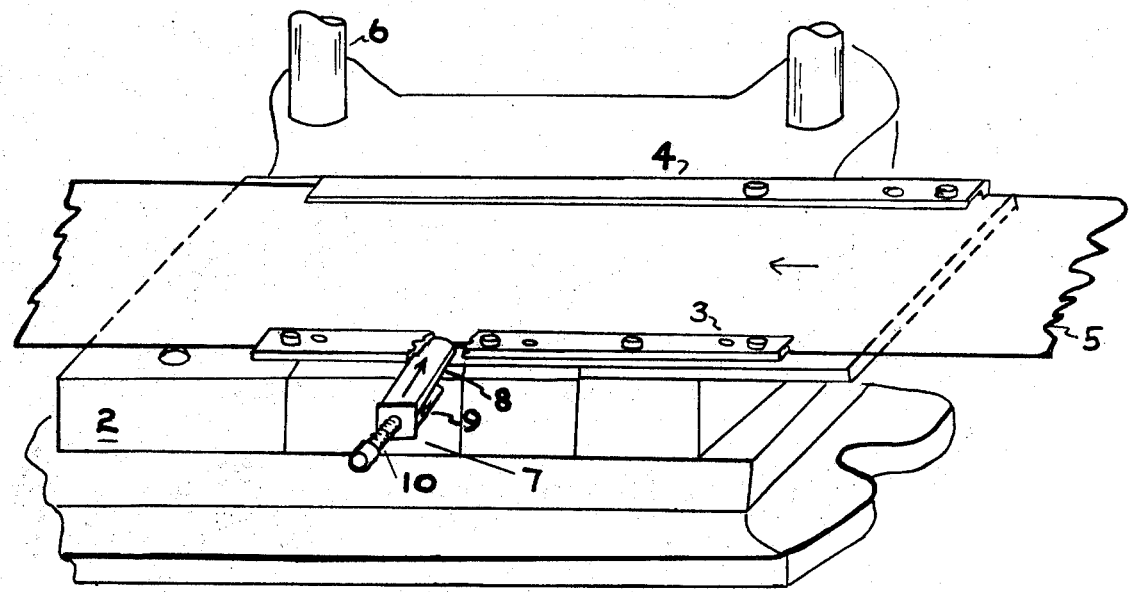
FIG. 1 is a view in perspective of a progressive die using front and rear stock guide rails and a standard pusher or positioning device.

Referring now to the drawings in detail, the work support table 1 contains a lower die section 2 to which is mounted front and rear stock guide rails 3 and 4 respectively. The stock 5, in the form of sheet metal is advancing in the direction of the arrow between the front stock guide rail 3 and the rear stock guide rail 4. The guideposts 6 at the rear of the work support table 1 act as guides for the upper punch section, (not shown). Mounted into the front stock guide rail 3 is a standard stock guide positioner or pusher 7, fitted into a groove in the front guide rail 3 which has been closely machined for a free slide fit. As is shown, the plunger 8, slides through the groove in the guide rail 3 against the tension of spring 10 on the guide rod 9.

The difficulty with the standard arrangement, as exemplified in the prior art, is that each stock guide rail 3 and 4 must be dowel located to the die sections with extreme accuracy usually plus or minus .001 of an inch. The stock pusher assembly 7 pushes the stock 5 against the rear stock guide rail 4 to prevent the stock from "floating" between the two stock rails. Nevertheless, it is necessary to maintain the front stock guide rail 3 even though the standard stock pusher 7 is utilized.

Figure 2:
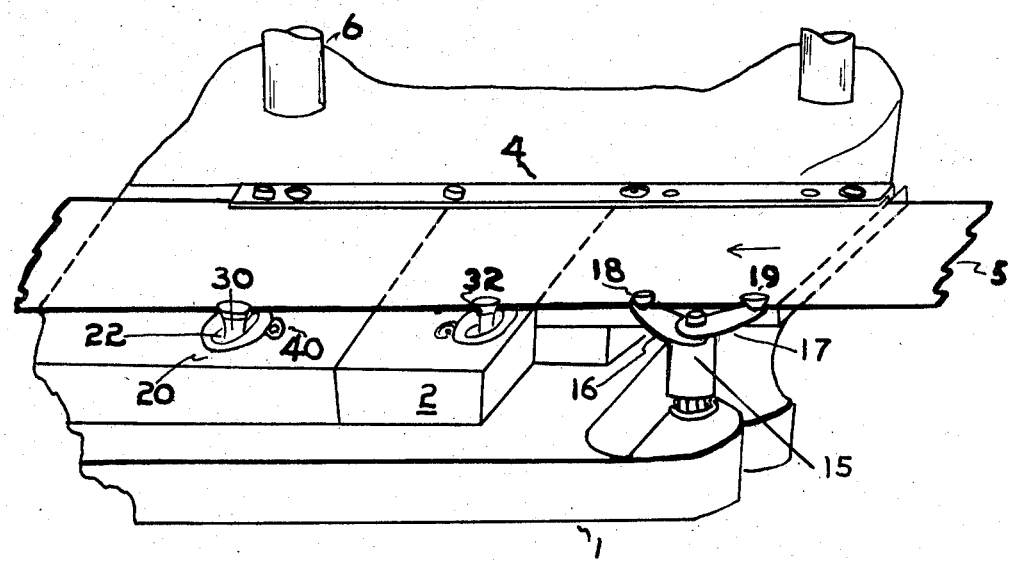
FIG. 2 is a view in perspective of a progressive die using a standard positioning device outside of the die area and the device of this invention in the die area.

Referring now to FIG. 2, another standard stock pusher 15, is illustrated which, however, must be mounted outside the die area. This stock pusher again acts to push the stock 5 against the rear stock guide rail 4 by use of two spring actuated arms 16 and 17 containing rotatable work engaging members 18 and 19 in engagement with the stock.

However, it will be noted in FIG. 2 that the front stock guide rail has not been utilized. The work positioning device 20 of this invention consisting of housing 21 and the work engaging protuberance 30, riding in arcuate slot 22 in engagement with the stock 5 has been substituted for the front stock guide rail 3. Since the work engaging protuberance 30 contains a cap plate 32, the stock 5 does not jump out of the track and thus the front stock guide rail 3 can be eliminated.

It should be apparent that the work positioning device, 20, of this invention is mounted into position with the stock 5 merely by drilling a hole into the lower die section 2 in proximity to the path of the advancing stock 5. Thus, the housing 21 is dropped into the hole and the unit 20 is secured into position by engagement of the head 41 of screw 40 with the detent portion 39 at the top of the housing 21. Since the work engaging protuberance is resiliently mounted in abutting relationship with the stock 5, and the work engaging protuberance 30 may ride through the arcuate path defined by slot 22, it is not necessary to utilize extreme precision in positioning of the unit 20 relative to the stock.

Figure 3:
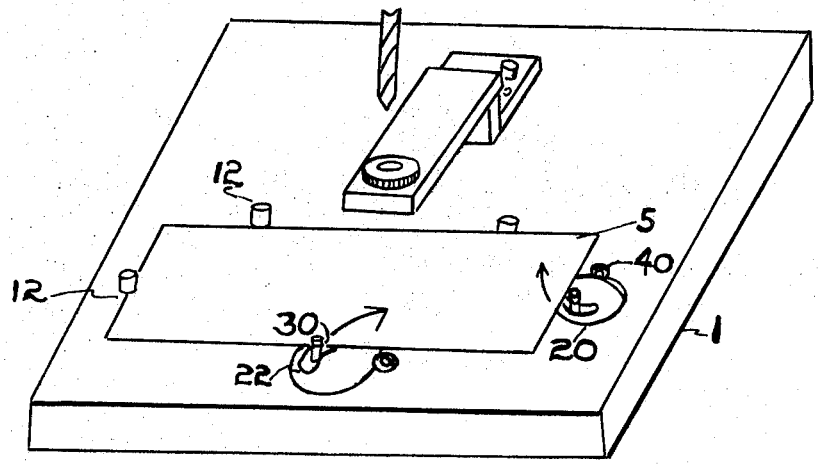
FIG. 3 is a view in perspective of a drill jig, utilizing the unit of this invention to push the workpiece into contact with fixed locator pins.

Referring now to FIG. 3, a simple drill jig is illustrated in which the unit 20 through the torque transmitted by the work engaging protuberance 30 push the workpiece 5 against fixed locator pins 12.

Figure 4:
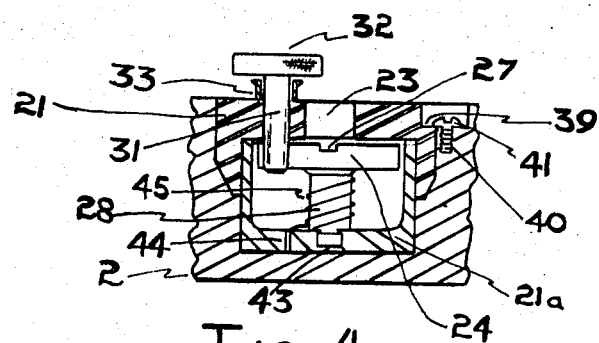
FIG. 4 is a sectional view, partially in elevation, of the device of this invention.
Figure 5:
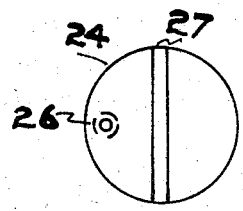
FIG. 5 is a plan view of the power storage member of this invention in the form of a power stem.
Figure 6:
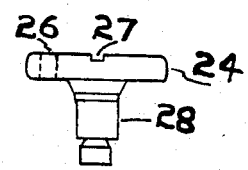
FIG. 6 is a side elevation of the power stem illustrated in FIG. 5.

Referring now to FIG. 4, the work positioning device 20 of this invention consists of a housing which in FIG. 4 consists of upper portion 21 and lower portion 21a. An arcuate slot 22, extends through the top of the housing 21 and a center opening 23 is in communication with the top of the power storage member 24 which, in this embodiment, is in the form of a power stem. The power stem has a cap plate 25, containing a screw driver blade receiving slot 27, in communication with the center opening 23 of the top 21 of the housing. The shaft 28 of the power stem 24 is rotatably fitted into a hole 43 located in the bottom of the portion of the housing 21a. It will be noted that the cap plate 25 of power stem 24 contains a tapped hole 26 in which the lower end of shaft 31 of the work engaging protuberance 30 is fitted. The shaft, 31, projects through the arcuate slot 22 at the top of the housing 21 to terminate in cap plate 32. In the embodiment shown, a hardened steel collar 33, beveled at the bottom at an angle of 45° is used to surround the shaft 31 of the work engaging protuberance 30 and thus engage the stock 5 or workpiece 5 in the embodiment previously described.

Now, surrounding the shaft 28 of the power stem 24, is a spring 45, which is anchored at one end to the shaft 28 and at the other end to hole 44 in the floor of the bottom portion of the housing 21a.

The top of the housing 21, contains a detent portion 39, for registry with the head 41 of screw 40, imbedded in the die section 2.

In order to tension the spring, the shaft 31 of the work engaging protuberance 30 is removed from tapped hole 26 in the cap plate 25 of the power stem 24. Thereafter, a screw driver blade is inserted in the slot 27 and the power stem is turned one or more revolutions to tension the spring 45 and to impart potential energy thereto. Thereafter, the tapped hole 26 is aligned with the arcuate slot 22 and the end of shaft 31 is fitted through the arcuate slot 22 into the hole 26. Thus, the arc of travel of work engaging protuberance 30 is limited through an arcuate path of about 30°, thus limiting the rotation of the power stem 24 and thus stores potential energy and torque which may be released when the hardened collar 33 is in engagement with the stock or workpiece 5 as previously illustrated.

Figure 7:
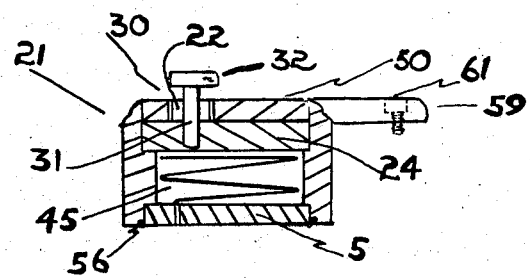
FIG. 7 is a sectional view, with parts in elevation, of a modification of the unit with a prestressed spring forming the means for applying torque to said power storage member and a holddown lug.

Referring now to the pretensioned spring embodiment, as illustrated in FIG. 7, the housing 21 consists of a cylindrical barrellike body containing upper plate 50, lower plate 51 and intermediate plate in the form of power storage member 24.

In this instance, the shaft 31 of the work engaging protuberance 30 is permanently attached through slot 22 of upper plate 50 to the power storage member 24.

Again, the spring 45 in anchored at one end to the power storage member 24 and at the other end to base plate 51. In order to tension the spring 45, the rotatably mounted base plate 51 is rotated one or more revolutions by means of a spanner wrench until the proper tension is placed on spring 45. Thereafter, the base plate 51 is immovably fixed into position by brazing or welding (as shown at 56) of the base plate to the sides of the barrellike casing 21 or by staking same through means (not shown). In this manner, the spring 45 is pretensioned to contain potential energy so as to exert torque on power storage member 24 which, in turn is limited in revolution by the engagement of shaft 31 on the work engaging protuberance 30 against the walls or slot 22.

Figure 8:
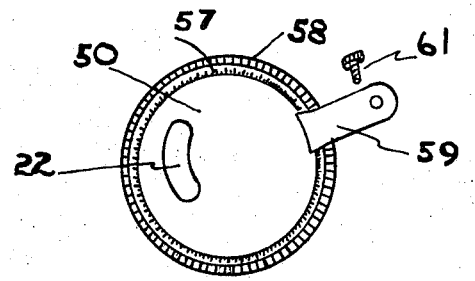
FIG. 8 is a plan view of the top of the housing illustrating a serrated portion and a holddown lug for anchoring said housing to said work support.
Figure 9:
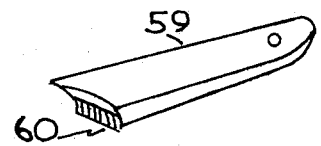
FIG. 9 is a perspective view of the holddown lug.

Now referring to FIG. 8, the arcuate slot 22 forms an arc segment of about 30°, thus limiting the path of travel of the work engaging protuberance 30. It will be noted that the edge 57 of housing 21 is tapered and contains serrations 58 around the upper edge of the wall. The lug 59, contains a tapered portion and serrated portion 60 having serrations that register with the serrations 58 in the top edge 57 of the housing 21 to hold the housing in position. The lug 59 is thus anchored to the die section 2 by means of screw 61. It will be appreciated that merely by loosening screw 61, the housing 21 may be revolved so as to offer almost unlimited adjustment.

Many modifications will occur to those skilled in the art from the detailed description hereinabove given, which description is meant to be exemplary in nature and nonlimiting except so as to be commensurate in scope with the appended claims.

I claim:

1. For use with a work support a workpiece positioning device comprising:
   A. a housing;
   B. a torque producing and transmitting member comprising, in combination:
      1. a power storage member rotatively mounted in said housing, including a power stem;
      2. means for applying torque to said power storage member; in which
         a. said means for applying torque to said rotatively mounted storage member comprises a spring mounted at one end to said housing and at the other end to said power storage member; and
         b. means for turning said power storage member through one or more revolutions and thus wind said spring and thereafter limit rotation of said power storage member in order to store potential energy; and
         c. means for turning said power stem including, in combination:
            1. a screw driver blade receiving slot in the top of said power stem, and,
            2. an opening in the top of said housing for provision of a screw driver.
      3. a torque transmitting and work engaging protuberance mounted in spaced relation from the axis of rotation of said power storage member and in operative relation with said power storage member, said protuberance being movable into abutting relation to a workpiece so as to transmit torque from said power storage member in said workpiece;
      4. means to limit the arc of travel of said protuberance and the rotation of said power storage member; and
   C. anchoring means for anchoring said housing to said work support in operative relation to said workpiece.

2. For use with a work support a workpiece positioning device comprising:
   A. a housing, including a base plate;
   B. a torque producing and transmitting member comprising, in combination:
      1. a power storage member rotatively mounted in said housing, including a power plate;
      2. means for applying torque to said power storage member; in which
         a. said means for applying torque to said rotatively mounted storage member comprises a spring mounted at one end to said housing and at the other end to said power storage member; and
         b. means for winding said spring in order to store potential energy,
         c. said means for winding said spring include a base plate which may be turned one or more revolutions to wind said spring and which is thereafter fixed in position;
      3. a torque transmitting and work engaging protuberance mounted in spaced relation from the axis of rotation of said power storage member and in operative relation with said power storage member, said protuberance being movable into abutting relation to a workpiece so as to transmit torque from said power storage member to said workpiece;
  4. means to limit the arc of travel of said protuberance and the rotation of said power storage member; and
C. anchoring means for anchoring said housing to said work support in operative relation to said workpiece.

3. For use with a work support a workpiece positioning device comprising:
A. a housing;
B. a torque producing and transmitting member comprising, in combination:
  1. a power storage member rotatively mounted in said housing;
  2. means for applying torque to said power storage member;
  3. a torque transmitting and work engaging protuberance mounted in spaced relation from the axis of rotation of said power storage member and in operative relation with said power storage member, said protuberance being movable into abutting relation to a workpiece so as to transmit torque from said power storage member to said workpiece;
  4. means to limit the arc of travel of said protuberance and the rotation of said power storage member;
    a. said means for limiting the arc of travel of said protuberance is a slot in the top of said housing through which said protuberance projects; and
C. anchoring means for anchoring said housing to said work support in operative relation to said workpiece.

4. A working positioning device, as defined in claim 3, in which said power storage member is a power stem.

5. A workpiece positioning device, as defined in claim 3, in which said power storage member is a power plate.

6. For use with a work support a workpiece positioning device comprising:
A. a housing;
B. a torque producing and transmitting member comprising, in combination:
  1. a power storage member rotatively mounted in said housing;
  2. means for applying torque to said power storage member;
  3. a torque transmitting and work engaging protuberance mounted in spaced relation from the axis of rotation of said power storage member and in operative relation with said power storage member, said protuberance being movable into abutting relation to a workpiece so as to transmit torque from said power storage member to said workpiece;
  4. means to limit the arc of travel of said protuberance and the rotation of said power storage member;
C. anchoring means for anchoring said housing to said work support in operative relation to said workpiece, in which said anchoring means comprising:
  1. a serrated portion around the wall of said housing;
  1. a detent portion at the top of said housing; and,
  2. a screw, mounted in said work support, with a portion of its head in engagement with said detent portion.

7. For use with a work support a workpiece positioning device comprising:
A. a housing;
B. a torque producing and transmitting member comprising, in combination:
  1. a power storage member rotatively mounted in said housing;
  2. means for applying torque to said power storage member;
  3. a torque transmitting and work engaging protuberance mounted in spaced relation from the axis of rotation of said power storage member and in operative relation with said power storage member, said protuberance being movable into abutting relation to a workpiece so as to transmit torque from said power storage member to said workpiece;
  4. means to limit the arc of travel of said protuberance and the rotation of said power storage member;
C. anchoring means for anchoring said housing to said work support in operative relation to said workpiece, said anchoring means comprising:
  1. a serrated portion around the wall of said housing;
  2. the combination therewith of a holddown lug having a serrated portion engageable with the serrated portion of said housing; and
  3. a screw for anchoring said holddown lug to said work support.